United States Patent [19]

Inoue et al.

[11] Patent Number: 4,527,034
[45] Date of Patent: Jul. 2, 1985

[54] ELECTRODE POSITIONING METHOD AND APPARATUS FOR NC-EDM

[75] Inventors: Kiyoshi Inoue, Tokyo; Akihiko Shimizu, Kawasaki, both of Japan

[73] Assignees: Inoue-Japax Research Incorporated, Yokohama; Japax Incorporated, Kawasaki, both of Japan

[21] Appl. No.: 461,555

[22] Filed: Jan. 27, 1983

[30] Foreign Application Priority Data

Feb. 3, 1982 [JP] Japan .................... 57-16836

[51] Int. Cl.$^3$ .............. B23P 1/08; B23P 1/14
[52] U.S. Cl. .................. 219/69 G; 219/69 C
[58] Field of Search ............ 219/69 G, 69 M, 69 C; 204/129.25, 129.5

[56] References Cited

U.S. PATENT DOCUMENTS

| | | | |
|---|---|---|---|
| 2,818,491 | 12/1957 | Matulaitis | 219/69 G |
| 3,474,216 | 10/1969 | Morgan, Jr. | 219/69 G |
| 3,536,881 | 10/1970 | Inoue | 219/69 G |
| 3,601,572 | 8/1971 | Check | 219/69 G |
| 3,614,371 | 10/1971 | Simpkins et al. | 219/69 G |
| 3,688,074 | 8/1972 | Stirner et al. | 219/69 G |
| 4,029,928 | 6/1977 | Ullmann et al. | 219/69 M |
| 4,039,779 | 8/1977 | Rupert | 219/69 G |
| 4,045,641 | 8/1977 | Ullmann et al. | 219/69 M |
| 4,288,675 | 9/1981 | Inoue | 219/69 M |
| 4,345,131 | 8/1982 | Semon et al. | 219/69 G |
| 4,361,745 | 11/1982 | Rupert et al. | 219/69 C |

FOREIGN PATENT DOCUMENTS

| | | | |
|---|---|---|---|
| 2041574A | 9/1980 | United Kingdom | 219/69 G |
| 2053514 | 2/1981 | United Kingdom . | |
| 2062294 | 5/1981 | United Kingdom . | |

Primary Examiner—Roy N. Envall, Jr.
Assistant Examiner—Geoffrey S. Evans
Attorney, Agent, or Firm—Karl F. Ross; Herbert Dubno

[57] ABSTRACT

An electrode positioning method and apparatus for NC-EDM wherein a tool electrode and a workpiece are relatively displaced under commands of an NC unit while EDM stock removal of the workpiece is advanced by developing effective electrical discharges between the tool electrode and the workpiece. The method comprises counting the effective electrical discharges, deriving a corrective amount of displacement from a prescribed amount of electrode wear per single effective discharge, the effective machining area of the tool electrode and the counted number of the electrical discharges. The corrective amount is used to correct the commanded relative displacement.

6 Claims, 5 Drawing Figures

FIG. 3
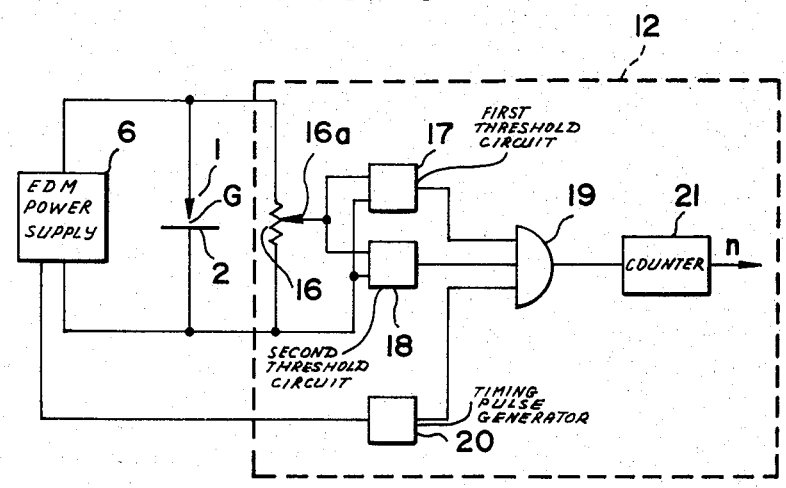
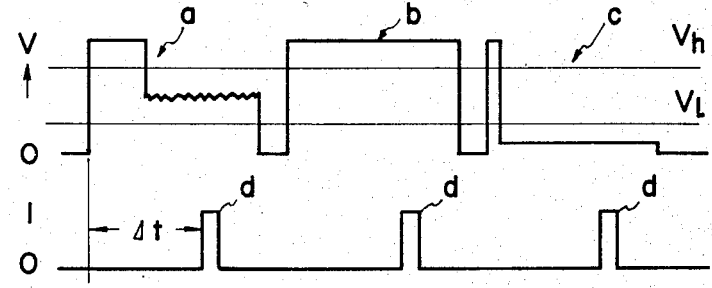
FIG. 4A
FIG. 4B

ELECTRODE POSITIONING METHOD AND APPARATUS FOR NC-EDM

FIELD OF THE INVENTION

The present invention relates to electrode positioning method and apparatus for numerically controlled electrical discharge machining (NC-EDM) and, more particularly, to a new and improved method of and apparatus for controlling relative positioning between a tool electrode and a workpiece in the course of NC-EDM operation.

BACKGROUND OF THE INVENTION

In NC-EDM, a desired extent of machining, for example, in the direction of depth of a workpiece is preprogrammed and numerical values corresponding to successive relative positions between the tool electrode and the workpiece are stored in an NC unit and used to produce command signals for executing the desired relative displacement. Thus, under the commands of the NC unit the tool electrode and the workpiece are relatively displaced while a succession of effective electrical discharges are developed between the tool electrode and the workpiece to advance EDM stock removal. When the commanded machining displacement coincides with the recorded final position, the displacement may be terminated.

In "wear" mode which is often preferred to "no wear" mode in the interest of achieving greater stock removal or erosion, the tool electrode erodes as well. Thus, with the electrode erosion or wear positively exploited, the programmed extent of relative displacement becomes deficient and need to be compensated for the amount of electrode wear in the direction of displacement. Thus, the operator is then required to measure the actual depth of stock removal and subsequently to undertake the corrective machining step. This procedure is naturally inefficient and inaccurate. While a variety of electrode wear compensation techniques have been proposed, it has been found that none of them is truly satisfactory.

OBJECTS OF THE INVENTION

It is accordingly an important object of the present invention to provide a new and improved method of automatically controlling relative positioning between a tool electrode and a workpiece in the course of NC-EDM operation, which method is efficient and reliable and affords greater machining accuracy than the conventional NC-EDM method.

Another important object of the invention is to provide a new and improved apparatus for carrying out the method described.

SUMMARY OF THE INVENTION

In accordance with the present invention there is provided, in a first aspect thereof, a method of controlling relative positioning between a tool electrode and a workpiece in a course of EDM operation, which method comprises: (a) displacing the tool electrode relative to the workpiece under commands of a numerical control unit while advancing EDM stock removal of the workpiece by developing effective electrical discharges between the tool electrode and the workpiece; (b) counting the effective electrical discharges; (c) deriving a corrective amount of displacement from a prescribed amount of electrode wear per single effective discharge, the effective machining area of the tool electrode and the counted number of the effective electrical discharges and; (d) controlling the commanded displacement in step (a) with said corrective amount derived in step (c).

Specifically, the corrective amount of displacement is derived and may be added to the commanded displacement for each unit time, upon lapse of such time, for each unit of the commanded displacement, upon completion of such unit of displacement, or upon completion of the commanded displacement over a predetermined entire distance.

The invention also provides in a second aspect thereof an apparatus for controlling relative positioning between a tool electrode and a workpiece in the course of EDM operation, which apparatus comprises: a numerical control unit for providing programmed commands to displace the tool electrode relative to the workpiece at a programmed rate by a programmed extent of displacement while EDM stock removal of the workpiece is advanced with effective electrical discharges produced between the tool electrode and the workpiece; first setting means for producing a first signal representing a prescribed amount of electrode wear per single electrical discharge; second setting means for producing a second signal representing an effective machining area of the tool electrode juxtaposed with the workpiece; means for counting the effective electrical discharges produced between the tool electrode and the workpiece to produce a third signal; and means responsive to said first, second and third signals for producing a corrective signal to act on said programmed commands, thereby correcting the relative displacement between the tool electrode and the workpiece.

BRIEF DESCRIPTION OF THE DRAWING

These and other features of the present invention as well as advantages thereof will become more readily apparent from a reading of the following description of certain preferred embodiments thereof when taken with reference to the accompanying drawing in which:

FIG. 3 is a circuit diagram, partly in a block form, illustrating a system for discriminating among applied pulses and counting, pulses resulting in effective electrical discharges; and FIGS. 4(A) and 4(B) are waveform diagrams illustrating various machining pulses including an effective electrical discharge pulse.

SPECIFIC DESCRIPTION

Figure 1:
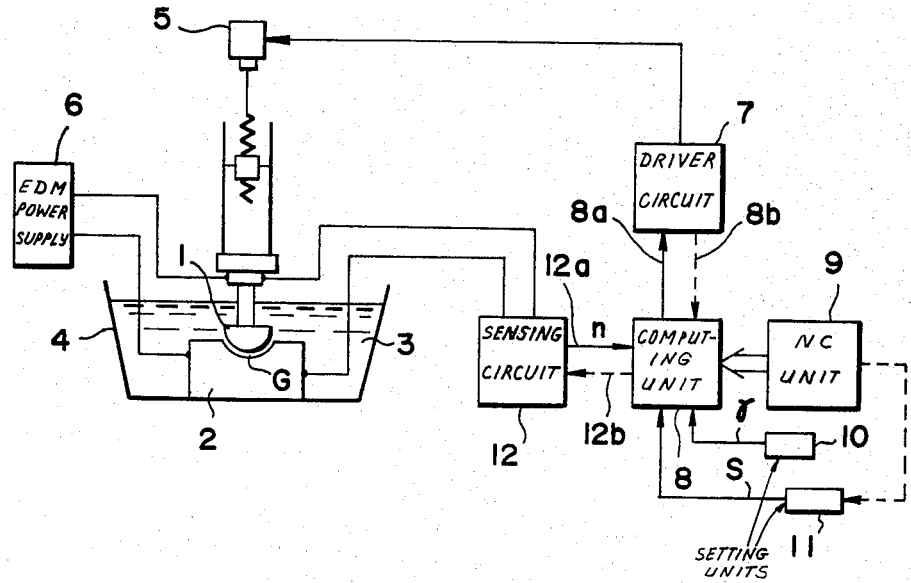
FIG. 1 is a diagrammatic view partly in a block form illustrating the principles of the present invention.

Referring first to FIG. 1, there is shown a tool electrode 1 spacedly juxtaposed with an electrically conductive workpiece 2 across an EDM gap G. The workpiece 1 is immersed in an EDM liquid 3 retained in a worktank 4. The tool electrode 1 is supported to be movable vertically or in the direction of a Z axis and is designed to be advanced axially into the workpiece 2 by a motor 5, e.g. a pulse motor, while EDM stock removal proceeds in the workpiece 2. The EDM stock removal is produced by a succession of electrical machining pulses furnished from an EDM power supply 6 which is electrically connected to the tool electrode 1 and the workpiece 2.

The motor 5 for advancing the tool electrode 1 is driven by a driver circuit 7 which is energized by the output 8a of a computing unit 8 in accordance with the principles of the present invention. The computing circuit 8 has a first input connected to an NC unit 9 and additional inputs connected to setting units 10 and 11, respectively. The computing unit 8 has a further input for receiving over a line 12a a signal developed at a sensing circuit 12 connected to the EDM gap G. The computing unit 8 is here designed to establish feedback loops with the driver circuit 7 via a line 8b and with the sensing circuit 12 via a line 12b.

The NC unit 9 provides the driver circuit 7 with command signals for causing the motor 5 to advance the tool electrode 1 at a programmed feed rate by a programmed extent. The first setting unit 10 furnishes the computing unit 8 with a value $\gamma$ representing a prescribed amount of electrode wear per single effective discharge. The value $\gamma$, which is constant for a given machining operation, is established at the setting unit 10 from present machining parameters including the electrode and workpiece materials, the kind of the EDM liquid 3 as well as the pulse duration $\tau on$ and interval $\tau off$ and peak current Ip of discharge pulses to be produced across the EDM gap. The second setting unit 11 furnishes the computing unit 8 with a value S representing the effective machining area of the tool electrode 1 which may be either constant or varying for a given machining operation. It will be noted that the tool electrode 1 shown has an effective machining area which varies as the machining proceeds. In such a case, successive values of the changing machining area are stored and, in the machining operation, are successively retrieved in conjunction with sequential signals furnished by the NC unit 9. The sensing circuit 12 provides the computing unit 8 with a signal representing the number of effective electrical discharges n produced across the EDM gap G per unit time. The computing unit 8 computes a corrective amount of displacement for the tool electrode 1 from the values $\gamma$, S and n.

Figure 2:
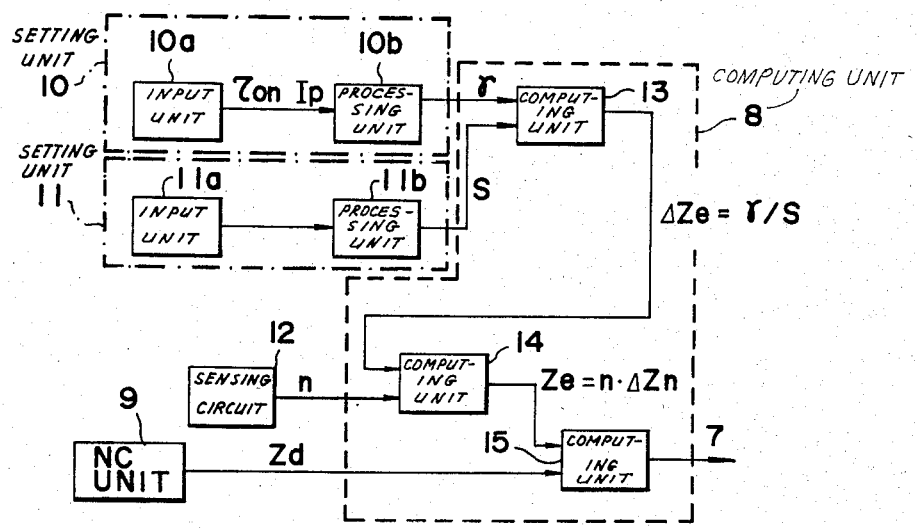
FIG. 2 is a block diagram illustrating a method according to the present invention.

Referring now to FIG. 2, the setting units 10 and 11 are the computing unit 8 are shown in detail. The setting unit 10 comprises an input unit 10a at which preset machining parameters determining a prescribed amount of electrode wear per single effective discharge are applied. These parameters include the pulse duration $\tau on$, pulse interval $\tau off$ and the peak current Ip of effective machining discharges as well as constants for electrode and workpiece materials and other machining settings. A processing unit 10b is connected to the input unit 10a to compute the prescribed amount of electrode wear per single effective discharge by means of a formula (1) or (1') as follows:

$$\tau = K_{96} \cdot (\tau on)^m \cdot (Ip)^n \text{ (grams/pulse)} \quad (1)$$

$$\tau = K_T \cdot (\tau on)^m \cdot (Ip)^n \cdot (\tau off)^p \text{ (grams/pulse)} \quad (1')$$

where $K_T$, m, n and p are constants depending on electrode and workpiece materials and other machining settings.

The setting unit 11 comprises an input unit 11a at which data for the shape and the size of the tool electrode 1 are applied. A processing unit 11b is provided to compute a constant or successive values for the effective area S of the tool electrode 1.

The computing unit 8 includes three processors or computers 13, 14 and 15. The first processor 13 is responsive to the output $\tau$ of the setting unit 10 and the output S of the setting unit 11 and computes the value $\Delta Ze$ representative of the amount of electrode wear per single effective discharge per unit area as follows:

$$\Delta Ze = \tau/S \quad (2)$$

The second processor or computer 14 has a first input receiving the computed value $\Delta Ze$ and a second input receiving the value n that is the number of effective discharges detected by the sensing unit 12 across the EDM gap G for each unit time. The processor 14 then computes the value Ze as follows:

$$Ze = n \cdot \Delta Ze \quad (3)$$

It is seen that the value Ze represents the amount of electrode wear produced per unit time per unit area and can effectively serve as a corrective rate of electrode displacement or a corrective amount of electrode displacement per unit time. The value Ze is applied through its first input to the third processor 15 which has its second input receiving a command signal for the electrode displacement Zd from the NC unit 9. The third processor 15 computes the corrected amount (rate) of displacement as follows:

$$Z = Zd + Ze \quad (4)$$

FIG. 3 shows an embodiment of the discharge sensing circuit 12. The circuit 12 shown includes a resistor 16 connected across the EDM gap G in parallel with the EDM power supply 6. The resistor 16 has a potentiometer tap 16a which feeds into a first threshold circuit 17 (e.g. Schmitt-trigger circuit) having an upper threshold level Vh for the machining pulses and a second threshold circuit 18 (e.g. Schmitt-trigger circuit) having a lower threshold level Vl for the machining pulses. The outputs of the threshold circuits 17 and 18 feed into an AND gate 19 which has a further input connected via a timing pulse generator 20 to the EDM power supply 6. As shown in FIG. 4, successive output pulses a, b and c from the EDM power supply 16 may have different load characteristics. The first pulse a is shown to be an effective discharge pulse, the second pulse b is a no-load or open-circuit pulse and hence ineffective and the third pulse c is a short-circuit pulse and again ineffective. The timing generator 20 provides a monitoring period d which is established for a short duration after the lapse of time t subsequent to the initiation of each pulse a, b, c. It can be seen that for each duration d, only when the pulse voltage lies between Vh and Vl (as in a) is the AND gate 19 enabled to provide a "1" output. A counter 21 is provided to selectively count such "1" outputs which represent occurrences of effective machining discharge across the EDM gap G between the tool electrode 1 and the workpiece 2. Thus, a signal representing the number of effective discharges n develops at the output of the counter 21 and is applied to the computer 14 shown in FIG. 2.

It will be understood that the principles of the present invention are applicable not only to the vertical electrode displacement as shown but to any other relative displacement which may be employed in NC-EDM, e.g. where the tool electrode and the workpiece are relatively displaced in a horizontal plane along an orbital path.

What is claimed is:

1. An NC-EDM method of machining a conductive workpiece by means of a tool electrode undergoing erosive wear across a machining gap, comprising the steps of:
   advancing EDM stock removal in the workpiece by developing a succession of effective electrical discharges across the gap while relatively displacing the tool electrode and the workpiece under a sequence of numerical commands furnished from a numerical control (NC) unit; and
   correcting the numerically commanded relative displacement so as to compensate for the electrode wear during said EDM stock removal by:
   producing a first signal representing a prescribed amount ($\gamma$) of the electrode wear per single effective electrical discharge for said EDM stock removal,
   counting the effective electrical discharges during said EDM stock removal to produce a second signal representing the counted number (n) of the effective electrical discharges,
   producing a third signal representing an effective machining area (S) of the tool electrode during said EDM stock removal, and
   during said EDM stock removal, processing said first, second and third signals in a data-processing unit to compute, according to an equation: $Ze = n \cdot \gamma / S$, a corrective amount (Ze) of relative displacement represented by a signal and modifying said numerical commands with said corrective signal to add said computed amount to an amount (Zd) of said numerically commanded displacement effected between the tool electrode and the workpiece.

2. The method defined in claim 1 wherein said effective electrical discharges are counted for each unit of time and said numerical commands are modified so that the addition of the amount (Ze) to the amount (Zd) occurs upon lapse of each such time unit.

3. The method defined in claim 1 wherein said effective electrical discharges are counted for each unit of the commanded displacement and said numerical commands are modified so that the addition of the amount (Ze) to the amount (Zd) occurs upon completion of each such unit of the commanded displacement.

4. The method defined in claim 1 wherein said effective electrical discharges are counted for a predetermined time period and said numerical commands are modified so that the addition of the amount (Ze) to the amount (Zd) occurs upon lapse of such a time period.

5. The method defined in claim 1 wherein said effective electrical discharges are counted for a predetermined distance of the commanded displacement and said numerical commands are modified so that the addition of the amount (Ze) to the amount (Zd) occurs upon completion of the commanded displacement over such a distance.

6. An NC-EDM apparatus for machining a conductive workpiece by means of a tool electrode undergoing wear, comprising:
   a numerical control (NC) unit for providing programmed commands to relatively displace the tool electrode and the workpiece while EDM stock removal in the workpiece is advanced with effective electrical discharges between the tool electrode and the workpiece across a machining gap; and
   means for correcting the commanded relative displacement so as to compensate for the electrode wear during said EDM stock removal, comprising:
   first setting means for producing a first signal representing a prescribed amount ($\gamma$) of the electrode wear per single electrical discharge for said EDM stock removal,
   second setting means for producing a second signal representing an effective machining area (S) of the tool electrode juxtaposed with the workpiece across the gap for said EDM stock removal,
   means for counting the effective electrical discharges occurring between the tool electrode and the workpiece for said EDM stock removal to produce a third signal representing the counted number (n) of the effective electrical discharges, and
   a data processing unit associated with said first and second setting means and said counting means for processing said first, second and third signals to compute, according to an equation: $Ze = n \cdot \gamma / S$ a corrective amount (Ze) of displacement represented by a corrective signal and for modifying said programmed commands from said NC unit with said corrective signal to add said computed amount (Ze) to an amount (Zd) of said commanded displacement.

* * * * *